Figures 1, 2:
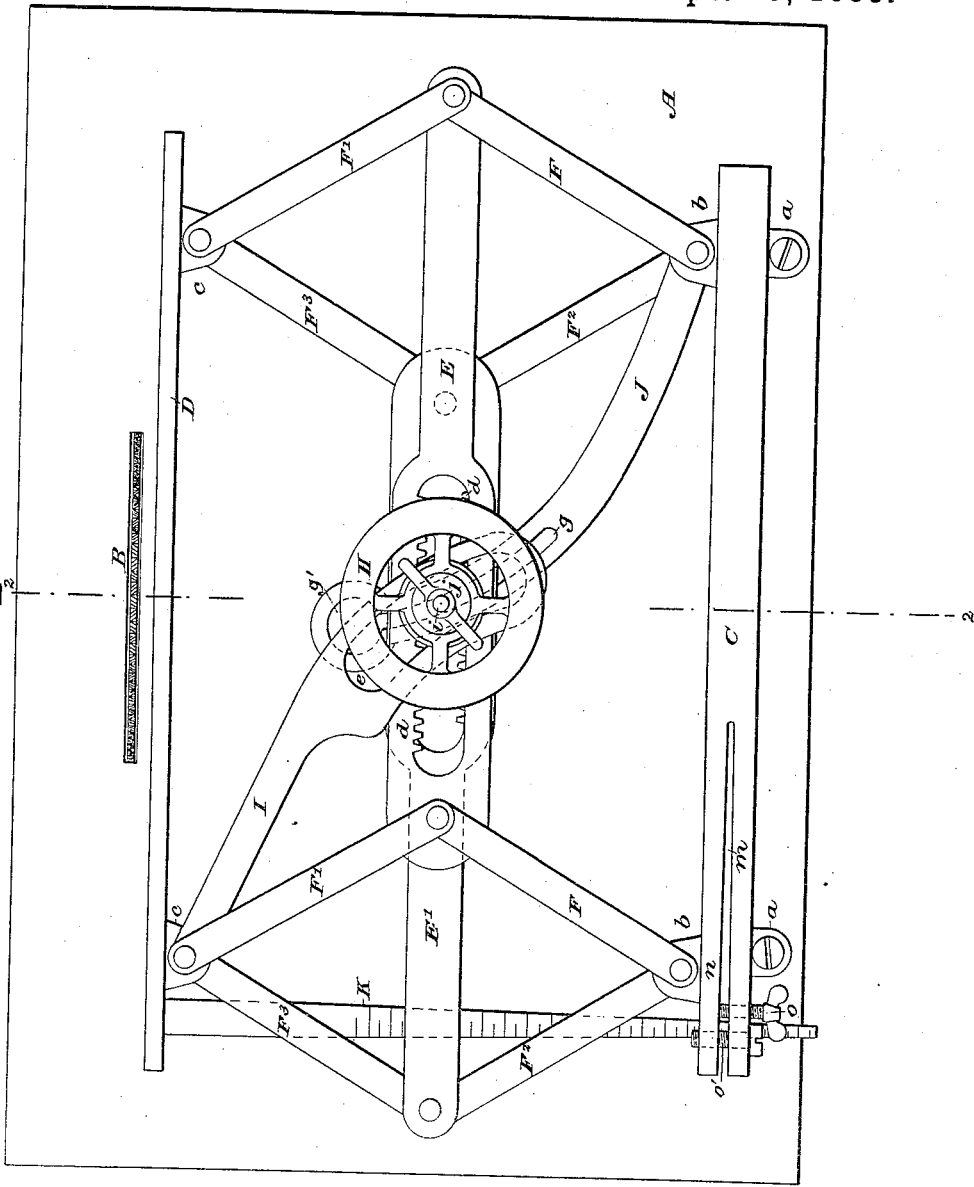

(No Model.) 3 Sheets—Sheet 1.

H. T. RAWLINGS.
SAW TABLE GAGE.

No. 326,454. Patented Sept. 15, 1885.

WITNESSES:
E. B. Bolton
Geo. Dainson

INVENTOR:
Henry T. Rawlings
By his Attorneys,
Burke, Fraser & Connell

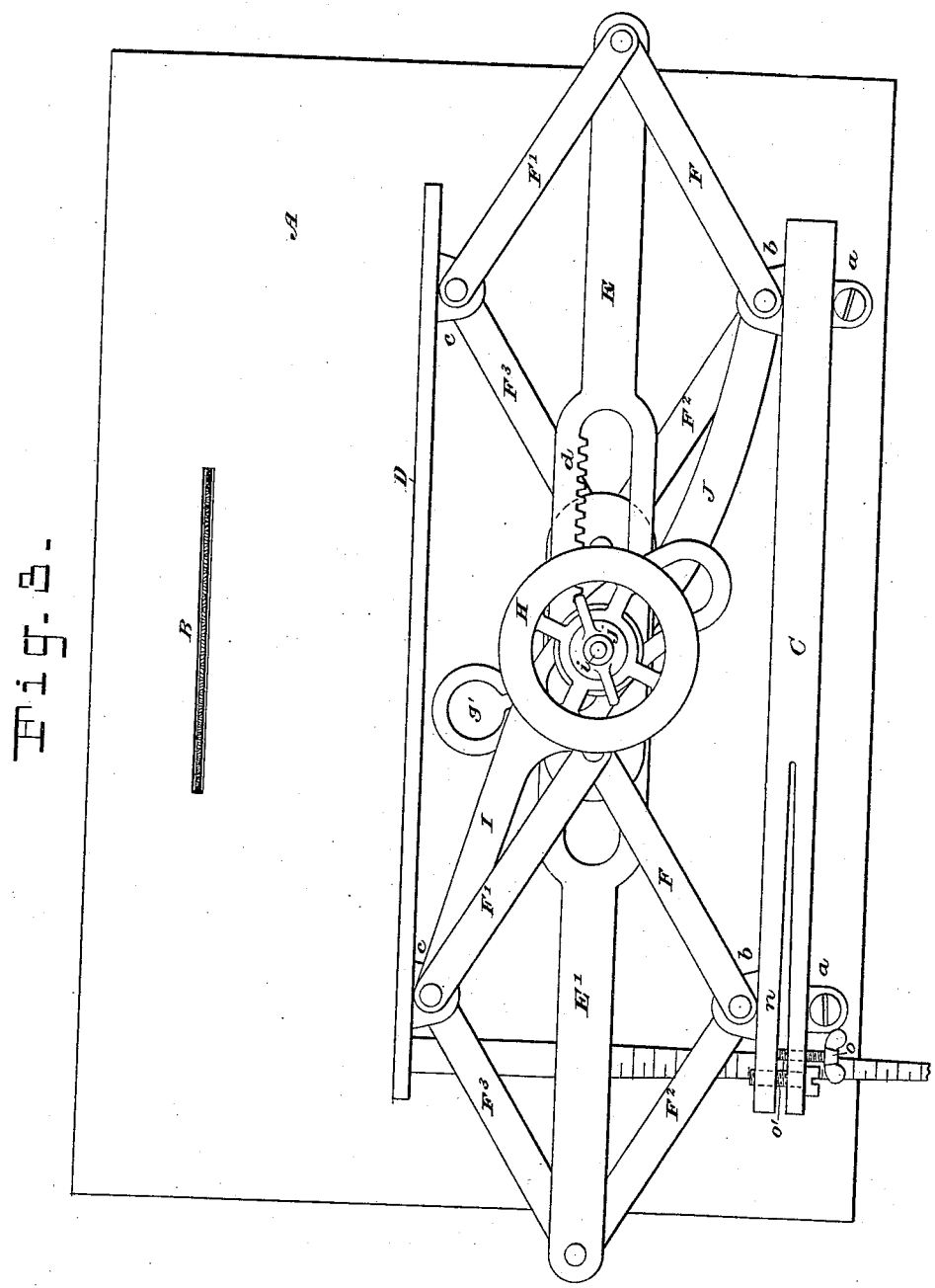

(No Model.)  3 Sheets—Sheet 3.
H. T. RAWLINGS.
SAW TABLE GAGE.
No. 326,454. Patented Sept. 15, 1885.
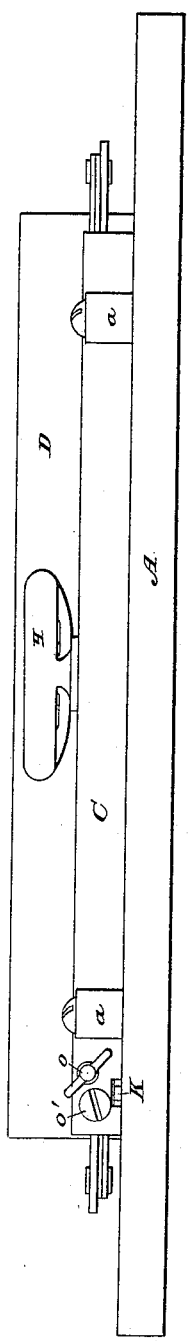
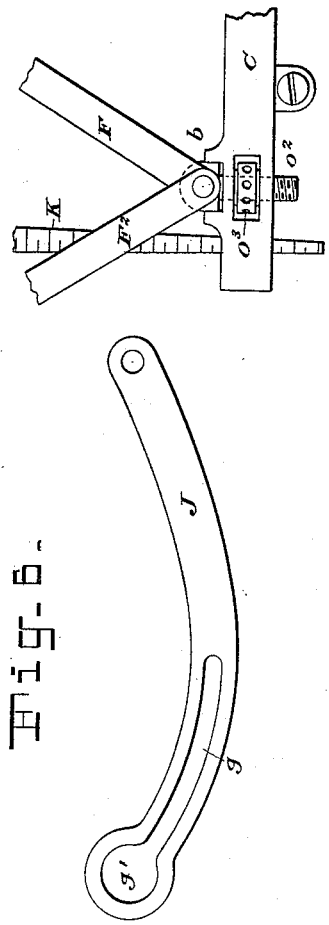
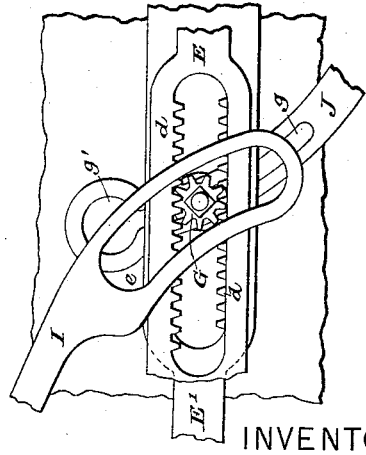
WITNESSES:
E. B. Bolton
Geo. Bainton
INVENTOR:
Henry T. Rawlings
By his Attorneys,
Burke, Fraser & Connell

UNITED STATES PATENT OFFICE.

HENRY T. RAWLINGS, OF NEW ALBANY, INDIANA.

SAW-TABLE GAGE.

SPECIFICATION forming part of Letters Patent No. 326,454, dated September 15, 1885.

Application filed April 25, 1885. (No model.)

*To all whom it may concern:*

Be it known that I, HENRY T. RAWLINGS, a citizen of the United States, and a resident of New Albany, in the county of Floyd and State of Indiana, have invented certain Improvements in Parallel Saw-Gages, of which the following is a specification.

My invention relates to that class of saw-gages usually designed for rip-sawing, wherein the guide against which the piece to be sawed is held is connected to that part of the gage which is secured to the saw-table by means of links, whereby the said guide may be adjusted toward or from the saw at will, and will always remain parallel therewith.

In the common form of such gages the guide moves, in setting it, obliquely to or from the saw, and consequently it does not remain opposite to the guide, as it should, in all positions. Such a gage has been provided with a graduated bar fixed to the guide, whereby the distance of the guide from the saw may be ascertained by inspection. So far as I am aware such gages have never been provided with means for correcting the parallelism of the guide with respect to the plane of the saw. This is an important feature, as in shifting and changing saws they do not always stand in precisely the same positions, and the result is, that the piece being cut will follow the guide and not the plane of the saw, and thus bad results will be produced, as will be understood by those skilled in the use of these machines.

The object of my invention is, in part, to provide a parallel gage in which the guide, while remaining parallel with the saw, moves to and from the saw in a plane parallel with the saw-axis when it is being set or adjusted;
in part to provide the gage with a means whereby the guide may be adjusted into a parallel position with respect to the saw without the necessity of removing the gage from the saw-table and resetting it thereon, and in part to provide the gage with means for bracing the guide when once adjusted or set at the desired distance from the saw.

The novel features of my invention will be hereinafter fully described, and particularly defined in the claims.

In the drawings, which serve to illustrate my invention, Figure 1 is a plan of my improved gage in position on the saw-table with the guide set near the saw. Fig. 2 is a transverse section of the same, taken in the plane of line 2 2 in Fig. 1. Fig. 3 is a plan similar to Fig. 1, but showing the guide set further from the saw and the parts in a different position from that shown in Fig. 1. Fig. 4 is a rear elevation of the gage—that is, of the side opposite the saw. Fig. 5 is a plan of the pinion and adjacent parts of the gage as they appear when the wheel and clamp-nut are removed. Fig. 6 is a view of one of the braces detached. Fig. 7 illustrates a modification that will be referred to hereinafter.

Let A represent any suitable saw-table, which may be of any dimensions; and B, a circular saw, which projects up through a slot in the table in the usual way. My gage is constructed as follows:

C is a bed-piece, which is fixed firmly to the table by screws $a\,a$, or by other means.

D is the guide, which is designed to stand parallel with the saw and to serve as a guide for the piece to be sawed.

E is a rack-bar, which is coupled to the bed-piece C at its ends by links F F, and to the guide D at its ends by links F' F'.

E' is another and similar rack-bar, which is coupled, respectively, to the bed-piece C and guide D by links $F^2\,F^2$ and $F^3\,F^3$. The links F and $F^2$ are coupled in pairs to the bed-piece at $b\,b$, and the links F' and $F^3$ to the guide D at $c\,c$, all as clearly shown. The rack-bars stand parallel to the guide and bed-piece, and are superimposed. Each bar has a slot formed in it, and on each a toothed rack, $d$, is formed on the side of the slot; but these racks are oppositely arranged, as shown.

G is a toothed pinion constructed to fit into the slots in the rack-bars, and to mesh on opposite sides with the racks $d$. On the pinion I form, by preference, a square bearing, $h$, to receive a hand-wheel, H, which has a square hole to fit the bearing $h$. From this bearing projects a screw-threaded stud, $i$, on which is screwed a clamping-nut, $j$. On the lower face of the pinion I form a cylindrical neck or bearing, $k$, (seen in Fig. 2,) and below this is formed a convex or rounded base, $l$, to rest on and slide over the saw-table.

In order to brace and steady the pinion G and guide D, I provide the gage with two braces, I and J. The upper brace, I, is coupled to the guide D at the same point, $c$, where the links $F^3$ $F'$ are coupled, (at the left in Fig. 1,) and in it is formed a slot, $e$, in which the pinion G plays. The lower brace, J, is coupled to the bed-piece C at the same point, $b$, where the links $F^2$ $F^2$ are coupled, (at the right in Fig. 1,) and in it is formed a slot, $g$, which embraces the neck $k$ on the lower face of the pinion G. In order to engage this neck on the pinion, I form in the end of brace J an eye, $g'$, large enough to pass the button $l$ through. I might construct the upper brace, I, with a narrow slot and arrange it to embrace a rounded neck on the upper face of pinion G; but the construction shown will serve as well.

In setting the gage it is only necessary to loosen nut $j$ and turn wheel H. The pinion G will be rotated, and by engaging racks $d$ either move the guide D toward the saw or from it, according to which way the wheel is turned. When the proper adjustment or setting is effected, the nut $j$ is tightened, and this serves to clamp all the parts together—namely, the pinion, racks, and braces, and prevent any movement.

K is a graduated bar, which is usually made tapering to give it stiffness, and which is secured at its one end to the guide D. The free end of this bar passes through a slot formed by recessing the lower face of the bed-piece C, and the graduations may be read from the inner face of this bed-piece. I mount this bar at the end of the guide D, for reasons that will be explained hereinafter.

It will sometimes happen that after the gage is fixed to the table and a saw is mounted on the mandrel the guide D will not stand exactly parallel with the plane of the saw. I provide a device for adjusting the guide into a position exactly parallel with the saw under such circumstances, which device I will now describe.

I form a longitudinal slit, $m$, in one end of the bed-piece C, which slit must extend beyond the point $b$, where links F $F^2$ are coupled, thereby leaving a coupling-point, $b$, on a tongue, $n$, separated from the attaching-point $a$. I then set a screw, $o$, in C, with its tip bearing on the tongue $n$, and pass another screw, $o'$, through a smooth hole in C and screw it into tongue $n$. By loosening screw $o'$ and screwing in screw $o$ the tongue $n$ will be pressed forward and from C, and this will set this end (the left in Fig. 1) of the guide D toward the saw. By loosening screw $o$ and screwing in screw $o'$ the tongue $n$, and consequently the left-hand end of the guide, will be moved away from the saw. The amount of movement will usually be very slight. I place the graduated bar K at the end of the gage where this adjusting device is situated, in order that it may be near the coupling-point $b$ on tongue $m$, from which tongue the graduations are read.

In Fig. 7 I have shown a modification of this adjusting device, wherein the coupling $b$ is made in the head of a screw, $o^2$, which passes through a smooth hole in the bed-piece C, and through a capstan-nut, $o^3$, which turns in a mortise or recess in C and fits snugly endwise therein. When the nut $o^3$ is rotated, the coupling-point $b$ is moved toward or from the saw. In order to prevent rotation of the screw $o^2$, its square head is embraced by projections on the inner face of the piece C. The object is to provide the bed-piece C, which is fixed, with a movable and adjustable part capable of being moved toward and from the fixed part by a screw, and to couple the links at this end of the bed-piece to this movable part. In Fig. 1, $n$ is this movable part.

I do not limit myself to the precise construction and arrangement of parts as herein shown, as these may be departed from to some extent without materially affecting my invention—as, for example, the brace I may be coupled to the right-hand end of the guide and the brace J to the left-hand end of the bed-piece.

I claim the right to employ all well-known equivalents of the devices described.

Having thus described my invention, I claim—

1. A saw-gage comprising a bed-piece and a guide coupled to two rack-bars by links arranged in pairs, substantially as described, the said links and rack-bars, an operating-pinion constructed to engage and operate said rack-bars, two braces, substantially as described, constructed to brace and steady said pinion, and means, substantially as described, for operating said pinion and clamping the parts when the adjustment is effected, whereby the guide is made to move in a plane parallel with the saw arbor or mandrel, substantially as set forth.

2. In a saw-gage comprising a bed-piece, a guide, and means, substantially as described, for effecting the parallel movement of the guide toward and from the bed-piece, the mechanism, substantially as described, for adjusting the guide to a position exactly parallel with the plane of the saw, which mechanism comprises a movable part on the bed-piece, to which the links are coupled at that end, and a screw for effecting the setting of this piece with respect to the bed-piece, whereby this latter adjustment may be effected without dismounting and resetting the bed-piece, as set forth.

3. In a saw-gage, the combination, with the bed-piece, the guide arranged parallel thereto, the superimposed and slotted neck-bars arranged between the guide and bed-piece and parallel thereto, the eight links of equal length arranged in the form of two parallelograms and coupled to the guide, bed-piece, and rack-bars, as set forth, the pinion mounted in the slotted rack-bars and its opposite sides meshing, respectively, with the racks on the same, the diagonally-arranged slotted braces I and J, their slotted ends embracing the pinion-axis and their other ends coupled, respectively, to the guide and bed-piece at diagonally-opposite points, the clamping-nut mounted on the screw-threaded stud on the pinion, whereby the racks and braces are clamped fast together, and the graduated bar K, fixed at one end to the guide and extending back and crossing the bed-piece, substantially as set forth.

4. In a saw-gage, the combination, with the guide, the bed-piece, the superimposed and slotted rack-bars arranged between the bed-piece and guide and parallel thereto, the eight links of equal length arranged in the form of two parallelograms and coupled to the guide, bed-piece, and racks to form a parallel motion, as set forth, the pinion G, mounted in the slots in the rack-bars and engaging at its opposite sides the racks on said bars, and provided with a button, $l$, on its lower end, a neck, $k$, to receive the lower brace, a square, $h$, to receive the hand-wheel, and a screw-threaded stud, $i$, to receive the clamping-nut, the said hand-wheel and clamping-nut, and the diagonally-arranged slotted braces I and J, their slotted ends embracing the pinion-axis and their other ends coupled, respectively, to the guide and bed-piece, substantially as set forth.

5. In a saw-gage wherein the guide is constructed to be moved to and from the fixed bed-piece by a parallel motion composed of links, the said bed-piece provided with a tongue, $n$, which may be moved independently of the bed-piece, and to which the links are coupled at one end of said bed-piece, and screws $o\ o'$, mounted in said bed-piece and tongue, as described, whereby the tongue may be moved toward and from the bed-piece and fixed in position, substantially as and for the purposes set forth.

6. In a saw-gage, the combination of the bed-piece constructed to be attached to the saw-table and provided with a slit, $m$, the screws $o$ and $o'$, and lugs at $b\ b$, for coupling the links to said bed-piece, the guide, the slotted and superimposed rack-bars provided with racks $d$, arranged oppositely, as described, the eight links, the slotted braces, the pinion, its operating-wheel, and the clamp-nut, all constructed and arranged to operate substantially as set forth.

7. In a saw-gage, the combination of the guide, the mechanism, substantially as described, for moving the guide toward and from the saw, and for clamping it in position, the bed-piece provided with means, substantially as described, for adjusting the guide into a position exactly parallel to the saw, and the graduated bar K, fixed to the guide and constructed to pass under said bed-piece at or near the point $b$, where the adjusting mechanism is placed, substantially as and for the purposes set forth.

In witness whereof I have hereunto signed my name in the presence of two subscribing witnesses.

HENRY T. RAWLINGS.

Witnesses:
  N. ELBERT,
  T. ELBERT.